(12) United States Patent
Milacic

(10) Patent No.: US 9,431,667 B2
(45) Date of Patent: Aug. 30, 2016

(54) CATHODE CHANNEL SHUTOFF IN A FUEL CELL

(75) Inventor: Milos Milacic, New Boston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 610 days.

(21) Appl. No.: 13/364,796

(22) Filed: Feb. 2, 2012

(65) Prior Publication Data
US 2013/0202978 A1 Aug. 8, 2013

(51) Int. Cl.
*H01M 8/04* (2016.01)
*H01M 8/02* (2016.01)
*H01M 8/10* (2016.01)

(52) U.S. Cl.
CPC ....... *H01M 8/04089* (2013.01); *H01M 8/0258* (2013.01); *H01M 8/04223* (2013.01); *H01M 2008/1095* (2013.01); *Y02E 60/50* (2013.01)

(58) Field of Classification Search
CPC ......... H01M 8/0258; H01M 8/04089; H01M 2008/1095; H01M 8/04223; Y02E 60/50
USPC ....................................... 429/457
See application file for complete search history.

(56) References Cited

U.S. PATENT DOCUMENTS

| 5,981,098 | A | 11/1999 | Vitale |
| 7,687,090 | B2 | 3/2010 | Badding et al. |
| 8,298,714 | B2 | 10/2012 | Beutel |
| 8,865,362 | B2 | 10/2014 | Bang et al. |
| 2006/0263671 | A1 | 11/2006 | DeFilippis |
| 2008/0233443 | A1* | 9/2008 | Jacobsen et al. ............... 429/22 |
| 2009/0162707 | A1* | 6/2009 | Nakakubo et al. ............. 429/13 |
| 2009/0263697 | A1 | 10/2009 | Hashimoto et al. |

FOREIGN PATENT DOCUMENTS

| CN | 201266641 | Y | 7/2009 |
| CN | 101546835 | A | 9/2009 |
| CN | 101796677 | A | 8/2010 |
| JP | 2008140721 | A | 6/2008 |

OTHER PUBLICATIONS

Tang et al., "PEM fuel cell cathode carbon corrosion due to the formation of air/fuel boundary at the anode", Journal of Power Sources, 158, 2006, p. 1306-1312.
Bono et al., "Development of New TOYOTA FCHV-adv Fuel Cell System", SAE International, 2009, 7 pages.
Chinese Office Action for corresponding Application No. 201310037501.2, mailed Jan. 28, 2016, 8 pages.

\* cited by examiner

*Primary Examiner* — Cynthia H Kelly
*Assistant Examiner* — Monique Wills
(74) *Attorney, Agent, or Firm* — Brooks Kushman P.C.; Damian Porcari

(57) ABSTRACT

In at least one embodiment, a fuel cell comprising a cathode flow field and a strip is provided. The cathode flow field plate defines a plurality of cathode channels for receiving a first fluid from a cathode source when the fuel cell is in an operational state. The strip includes a flexible first portion positioned about the plurality of cathode channels, the flexible first portion for moving toward the plurality of cathode channels to prevent a flow of the first fluid therein when the fuel cell is in an inoperative state.

20 Claims, 3 Drawing Sheets

CATHODE CHANNEL SHUTOFF IN A FUEL CELL

TECHNICAL FIELD

Embodiments described herein generally relate to a cathode channel shutoff in one or more fuel cells that form a fuel cell stack.

BACKGROUND

It is generally known that a number of fuel cells are joined together to form a fuel cell stack. Such a stack generally provides electrical current in response to electrochemically converting hydrogen and oxygen into water and energy. The electrical current is used to provide power for various electrical devices in a vehicle or in other suitable mechanisms. Each fuel cell generally includes a proton exchange membrane (PEM) (or membrane) positioned between an anode catalyst and a cathode catalyst. A membrane electrode assembly (MEA) generally includes the membrane, the anode catalyst, the cathode catalyst and a pair of gas diffusion layers (GDLs) (one positioned on the anode side proximate to the membrane and another positioned on the cathode side proximate to the membrane). A first flow field plate that defines a plurality of channels is positioned on the anode side of the fuel cell. A second flow field plate that defines a plurality of channels is positioned on the cathode side of the fuel cell. During fuel cell stack startups, shutdowns, and soaks (i.e., non operation of the fuel cell), oxygen may be present on the cathode side of the PEM in which higher catalyst erosion due to oxygen diffusion through the MEA may be observed.

Degradation may be higher when fresh air enters into a cathode side of the fuel cell stack and diffuses through the MEA to the anode side creating an air/fuel boundary. For example, it has been found that at the air/fuel boundary developed at the anode side after a fuel cell shut down or during fuel cell restart may cause a quick degradation of the anode catalyst. The thickness, the catalyst active surface area, and therefore the performance of the anode catalyst layer may be reduced due to the presence of oxygen on the cathode side when the fuel cell is not operational and diffuses to the anode side where hydrogen is present.

SUMMARY

In at least one embodiment, a fuel cell comprising a cathode flow field and a strip is provided. The cathode flow field plate defines a plurality of cathode channels for receiving a first fluid from a cathode source when the fuel cell is in an operational state. The strip includes a flexible first portion positioned about the plurality of cathode channels, the flexible first portion for moving toward the plurality of cathode channels to prevent a flow of the first fluid therein when the fuel cell is in an inoperative state.

In another embodiment, a fuel cell comprising a cathode flow field, a membrane electrode assembly (MEA), and a strip is provided. The cathode flow field plate defines a plurality of cathode channels therein for receiving a first fluid when the fuel cell is in an operational state. The MEA is positioned about the cathode flow field plate and proximate to an anode flow field plate. The strip includes a flexible first portion positioned about the plurality of cathode channels, the flexible first portion being moveable toward the plurality of cathode channels to prevent a flow of the first fluid therein and through the MEA when the fuel cell is inoperative.

In another embodiment, a fuel cell stack comprising a plurality of fuel cells is provided. Each fuel cell includes a cathode flow field and a strip. The cathode flow field plate defines a plurality of cathode channels for receiving a first fluid from a cathode source when the fuel cell is in an operational state. The strip includes a flexible first portion positioned about the plurality of cathode channels. The flexible first portion for moving toward the plurality of cathode channels to prevent a flow of the first fluid therein when the fuel cell is in an inoperative state.

BRIEF DESCRIPTION OF THE DRAWINGS

The embodiments of the present invention are pointed out with particularity in the appended claims. However, other features of the various embodiments will become more apparent and will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
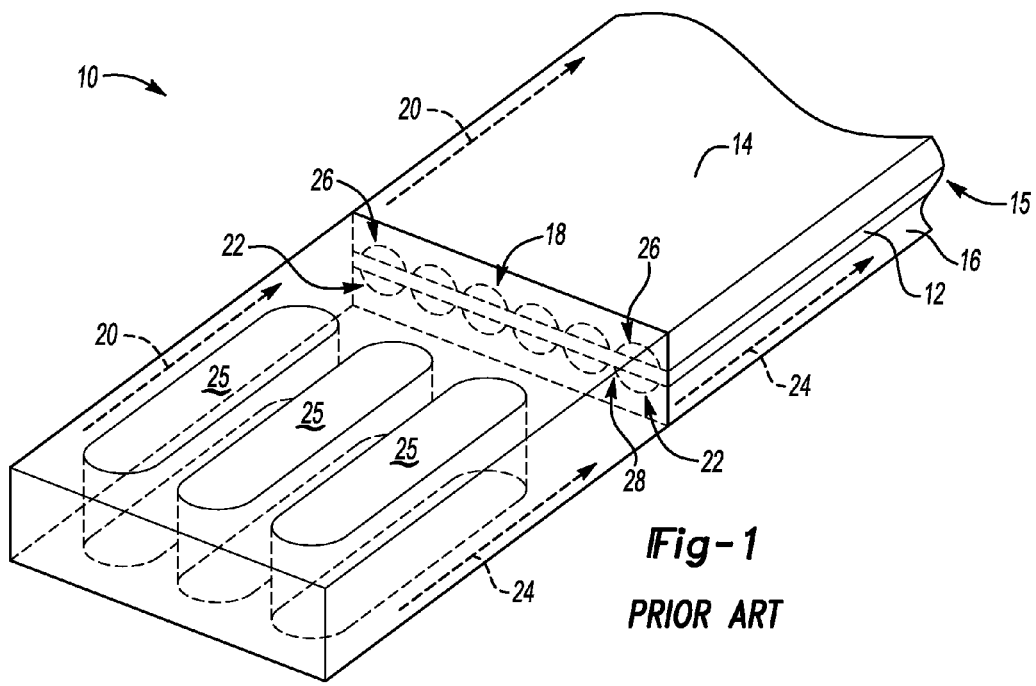
FIG. 1 depicts a conventional fuel cell implementation.

FIG. 1 depicts a conventional fuel cell implementation 10. The fuel cell 10 generally comprises a PEM ("membrane") 12, an anode flow field plate 14, and a cathode flow field plate 16. It is recognized that an anode catalyst (not shown) may be positioned between the anode flow field plate 14 and the membrane 12. In addition, a cathode catalyst (not shown) may be positioned between the cathode flow field plate 16 and the membrane 12. A membrane electrode assembly (MEA) 15 generally includes the membrane 12, the anode catalyst, the cathode catalyst and a pair of gas diffusion layers (GDLs) (one positioned on the anode side proximate to the membrane and another positioned on the cathode side proximate to the membrane).

The anode flow field plate 14 defines a plurality of anode channels 18 for receiving hydrogen (or fuel) in a first flow direction 20 from a hydrogen source located outside of the fuel cell 10. This will be discussed in more detail in connection with FIG. 3. An anode inlet 26 receives the hydrogen from the hydrogen source, which is then passed through the plurality of anode channels 18 when the vehicle is operational. The cathode flow field plate 16 defines a plurality of cathode channels 22 for receiving oxygen in a second flow direction 24 from an air source located outside of the fuel cell 10. This will be discussed in more detail in connection with FIG. 3. A cathode inlet 28 receives the oxygen from the air source, which is then passed through the plurality of cathode channels 22 when the fuel cell 10 is operational. Fluid ports 25 are positioned about the anode inlet 26 and the cathode inlet 28. In general, the fluid ports 25 include fluids such as air, hydrogen, and coolant fluid.

It is known that the fuel cell 10 may be joined with any number of additional fuel cells to form a fuel cell stack for generating power to drive a vehicle or other apparatus in response to electrochemically converting hydrogen and oxygen into water and energy. Oxygen, when present within the plurality of cathode channels 20 may cause the anode catalyst to degrade during fuel cell 10 startups, shutdowns and soaks (i.e., non-operation of the fuel cell). Degradation to the anode catalyst may be higher when fresh air enters into cathode channel 22 and diffuses through the MEA 15 to the anode side.

Figure 2A:
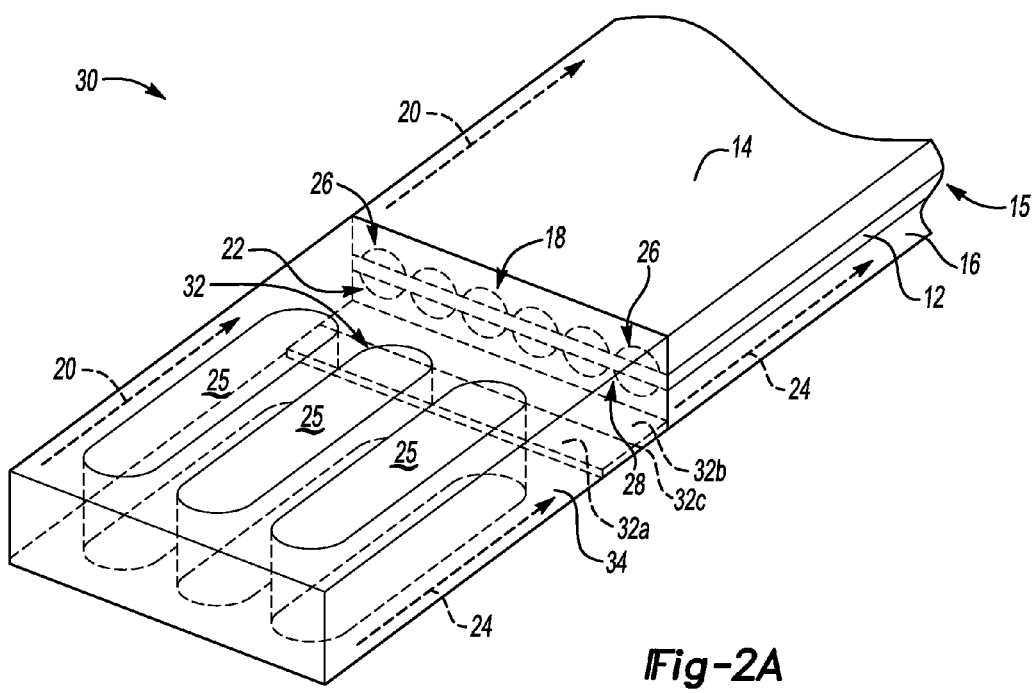
FIGS. 2a-2b depict a fuel cell implementation in accordance to one embodiment of the present invention.
Figure 2B:
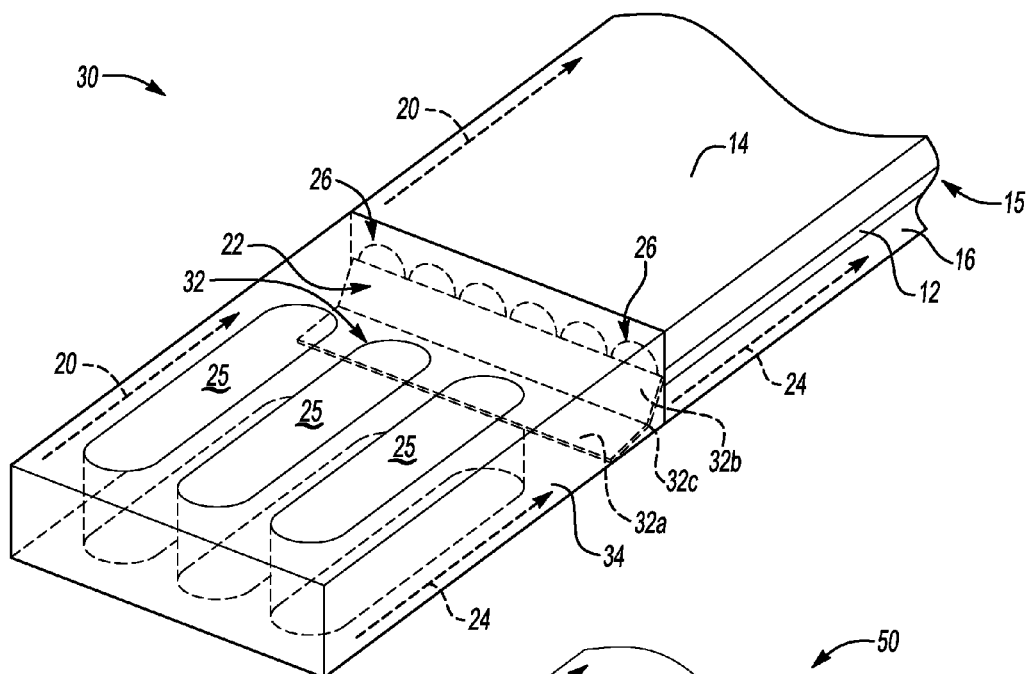

FIGS. 2a-2b depict a fuel cell implementation ("fuel cell") 30 in accordance to one aspect of the present invention. The fuel cell 30 includes a strip 32 that is generally positioned at the cathode inlet 28. The strip 32 is configured to prevent the flow of oxygen from flowing into the cathode channels 18 based on various operating states of the fuel cell 30. The strip 32 includes a first end 32a, a second end 32b, and a dividing portion 32c. The dividing portion 32c separates the first end 32a from the second end 32b. The first end 32a of the strip 32 is generally coupled to a surface 34 of the fuel cell 30. The second end 32b may move relative to the surface 34 of the fuel cell 30 (e.g., about the dividing portion 32c) and the cathode inlet 28 based on the operating state of the fuel cell 30.

For example, while the fuel cell 30 is operational (e.g., actively receiving oxygen from the cathode source and receiving hydrogen from the hydrogen source for the purpose of generating electrical power to drive the vehicle (or apparatus)), the oxygen while traveling in the second flow direction 24 into the cathode inlet 28 exerts a force against the second end 32b thereby causing the second end 32b to lie on the surface 34 of the fuel cell (or to move the second end 32b of the strip 32 away from the cathode inlet 28) to allow the flow of oxygen into the cathode channels 22 for enabling the generation of electrical power (see FIG. 2a).

When the fuel cell 30 is not operational (e.g., fuel cell is not receiving oxygen from the cathode source and not receiving hydrogen from the hydrogen source for the purpose of generating electrical power to drive the vehicle (or apparatus) (see FIG. 2b), the flow of oxygen (or the flow of air) is limited or not provided to the cathode inlet 28 by the cathode source thereby causing the second end 32b of the strip 32 to deflect upward to cover the cathode inlet 28 or at least a portion of the openings of the cathode channels 22. By covering the cathode inlet 28 or at least a portion of the opening of the cathode channels 22 with the strip 32, such a condition may prevent fresh air entering into the cathode channels 22 after vehicle shutdown. Such a condition may mitigate the corrosive effect that may be caused due to the presence of oxygen in the cathode channels 22. Once the strip 32 moves to cover the cathode channels 22, any remaining oxygen in the cathode channels 22 diffuses through the MEA 15 to the anode side, thereby minimizing the amount of oxygen in the cathode channels 22.

In general, the second end 32b of the strip 32 may be biased to cover at least a portion of the openings of the cathode channels 22 when the fuel cell 30 is in the non-operational state. For example, the second end 32b may be orientated at an angle that is less than 180 degrees with respect to the first end 32a such that the second end 32b is positioned off of the surface 34 (to provide a barrier for preventing fresh air from entering into the cathode channels 22) while the first end 32a remains positioned on the surface 34. It is recognized that the dimensions of the second end 32b of the strip 32 may be arranged so that the cathode channels 22 are covered to prevent the intrusion of oxygen therein.

The strip 32 (e.g., the first end 32a and the second end 32b) may be constructed from any number of flexible materials that are compatible with fuel cell operation. It is contemplated that the strip 32 is generally non-conductive and is suitable for withstanding deionized water. In yet another example, the first side 32a and/or the second side 32b may be formed (or coated) from stainless steel such as a 316 steel strip, graphite, gold foil, etc. It is also recognized the first side 32a and/or the second side 32b may be implemented to include any combination of the materials noted directly above. For example, the first side 32a may be formed of plastic and the second side 32b may be formed of 316 steel, etc. The first end 32a may be coupled to the surface 34 via adhesive if the first end 32a is implemented as a plastic material. In the event the first end 32a is formed of a 316 steel, graphite, or gold foil, the first end 32a may be welded (such as laser welded) to the surface 34 of the fuel cell 30.

It is also contemplated that the strip 32 may be formed of the same material that is used to produce the membrane 12. By constructing the strip 32 from the same material used to form the membrane 12, the strip 32 may be produced at the time the membrane 12 is constructed thereby reducing cost for the manufacture of the strip 32. It is recognized that the material used from the membrane 12 to form the strip 32 may be adequately flexible to enable the strip 32 to flex for the reasons note above.

Figure 3:
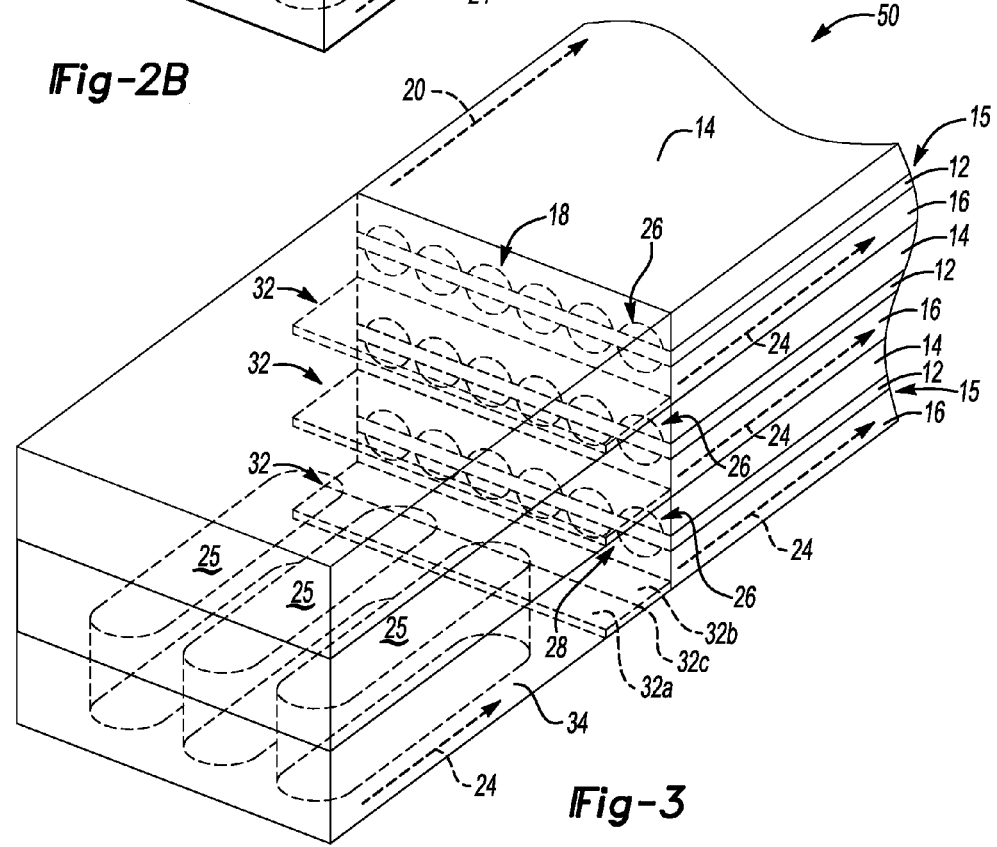
FIG. 3 depicts a plurality of fuel cells being formed into a fuel cell stack in accordance to one embodiment.

FIG. 3 depicts a plurality of fuel cells 10 being formed into a fuel cell stack 50 in accordance to another aspect of the present invention. The fuel cell stack 50 may have a single anode inlet (not shown) for receiving the hydrogen to provide to each set of anode inlets 26 for each corresponding fuel cell 10. Likewise, the fuel cell stack 50 may have a single cathode inlet for receiving the oxygen to provide to each set of cathode inlets 28 from each corresponding fuel cell 10. Hydrogen and oxygen may be delivered to each fuel cell 10 within the stack 50 for entry into the anode channels 18 and the cathode channels 16, respectively. By positioning the strip 32 at the cathode inlet 28 that is proximate to the cathode channels 28 (e.g., at the active area of the cathode) for each fuel cell 10 as opposed to positioning the strip 32 at the single cathode inlet proximate to the fuel cell stack, such a condition may allow for oxygen while in the cathode channels 22 to be quickly consumed. In the event the strip 32 is positioned at the single cathode inlet, more oxygen may be present both the inactive area and in the active area of the cathode.

Figure 4:
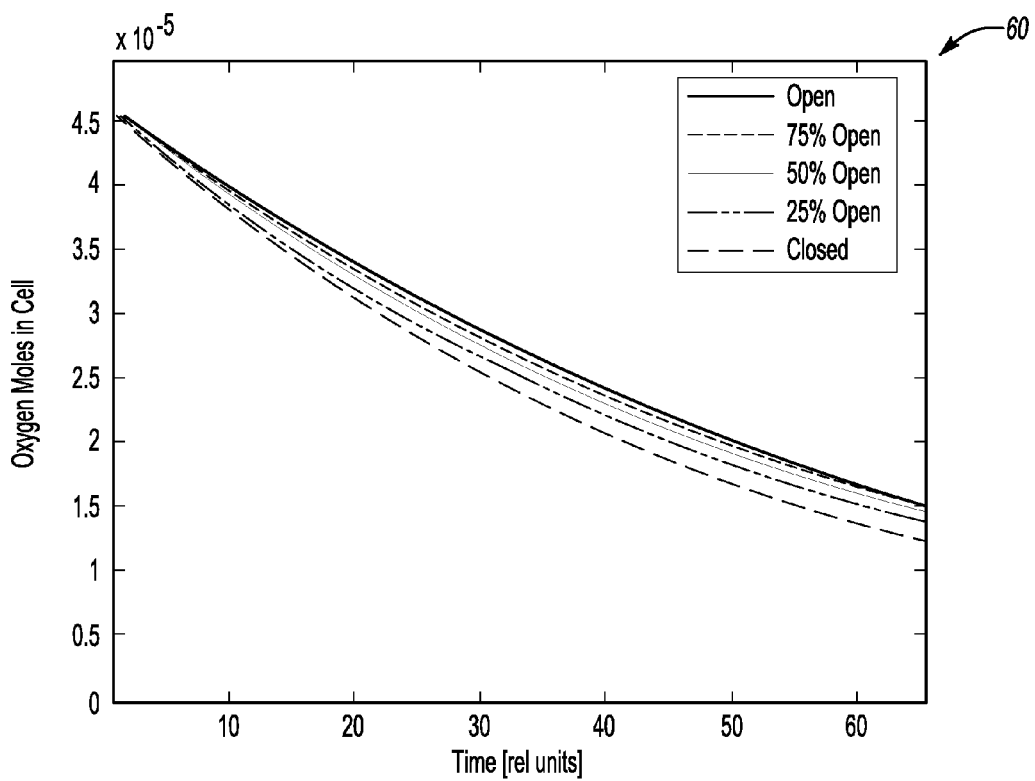
FIG. 4 depicts a plot illustrating an amount of oxygen that is present in the fuel cell based on the position of the strip in relation to a cathode inlet over time in accordance to one embodiment.

FIG. 4 depicts a plot 60 illustrating an amount of oxygen that is present in the fuel cell 10 based on the position of the strip 32 in relation to the cathode inlet 28 over time in accordance to one embodiment. For example, the plot 60 depicts an amount of oxygen that is present in the cathode channels 22 over time. As one may expect, the amount of oxygen present in the cathode inlet 28 reduces (or decays)

over time when the fuel cell 10 is not operational. As further exhibited, when the strip 32 is closed over the cathode inlet 28 as shown in connection FIG. 2b, less oxygen is generally present in the cathode channels 22 as time increases. In addition, depending on the amount the strip 32 is opened in relation to the cathode inlet 28, varying degrees of oxygen may be present in the cathode channels 22. For example, a smaller amount of oxygen is present in the cathode channels 22 when the strip 32 is 75% open in comparison to when the strip 32 is 50% open and so on. Experimentation has revealed that a 16% to 20% reduction of oxygen may be present when the strip 32 is in the fully closed position with respect to the cathode inlet 28 as opposed to a fuel cell implementation that fails to utilize the strip 32 altogether.

Figure 5:
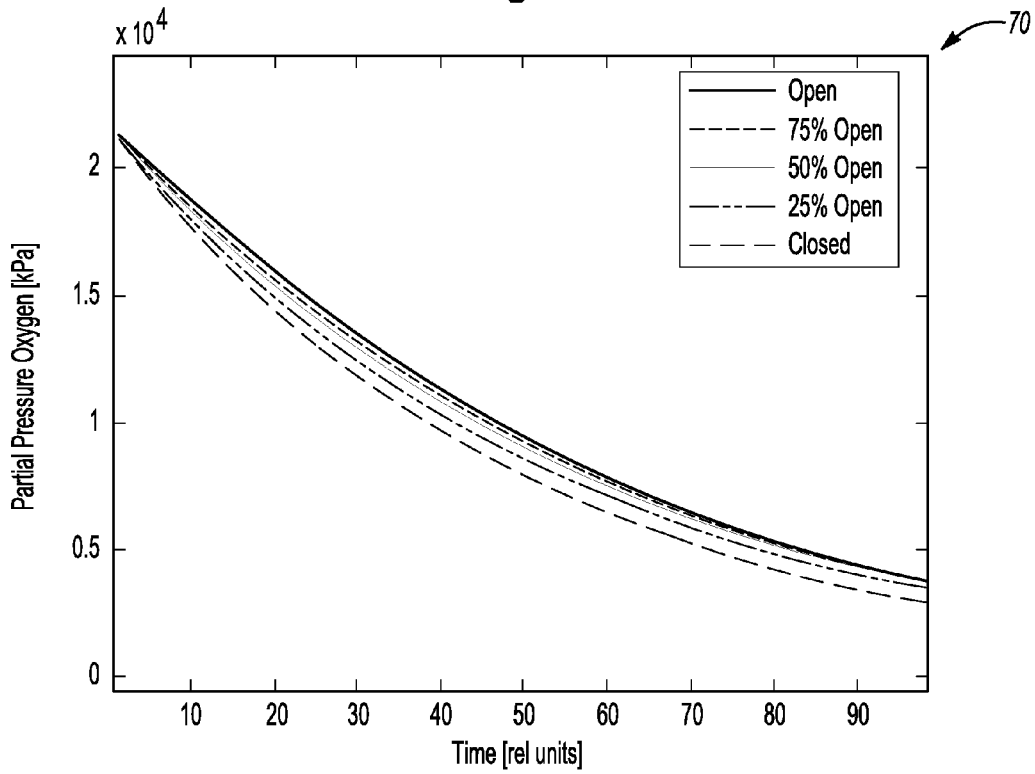
FIG. 5 depicts a plot a partial pressure of oxygen that is present in the fuel cell based on the position of the strip in relation to the cathode inlet over time in accordance to one embodiment.

FIG. 5 depicts a plot 70 illustrating a partial pressure of oxygen that is present in the fuel cell 10 based on the position of the strip 32 in relation to the cathode inlet 28 over time in accordance to one embodiment. As one may expect, the amount of partial pressure of oxygen present in the cathode inlet 28 reduces (or decays) over time when the fuel cell 10 is not operational. As further exhibited, when the strip 32 is closed over the cathode inlet 28 as shown in connection FIG. 2b, less oxygen is generally present in the cathode channels 22 as time increases thereby causing the pressure amount of the oxygen to be less when the strip 32 is closed. In addition, depending on the amount the strip 32 is opened in relation to the cathode inlet 28, varying degrees of pressure of oxygen may be present in the cathode channels 22. For example, a smaller pressure amount of oxygen is present in the cathode channels 22 when the strip 32 is 75% open in comparison to when the strip 32 is 50% open and so on.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A fuel cell comprising:
a cathode flow field plate defining a plurality of cathode channels therein for receiving a first fluid when the fuel cell is in an operational state;
a membrane electrode assembly (MEA) positioned about the cathode flow field plate and proximate to an anode flow field plate; and
a strip including a flexible first portion positioned about the plurality of cathode channels, the flexible first portion being moveable toward the plurality of cathode channels to prevent a flow of the first fluid therein and through the MEA when the fuel cell is inoperative.

2. The fuel cell of claim 1 wherein the flexible first portion is moveable from the plurality of cathode channels to enable the flow of the first fluid therein when the fuel cell is in the operational state.

3. The fuel cell of claim 1 wherein the strip further includes a second portion and a dividing portion.

4. The fuel cell of claim 3 wherein the second portion is coupled to a surface of the fuel cell and the flexible first portion being configured to move relative to the dividing portion.

5. The fuel cell of claim 3 wherein the flexible first portion is positioned at an angle of less than 180 degrees with respect to the second portion when the flexible first portion is moved toward the plurality of cathode channels.

6. The fuel cell of claim 3 wherein the flexible first portion is formed of rubber and is generally non-conductive and wherein the second portion is formed of one of stainless steel, graphite, and gold foil.

7. The fuel cell of claim 1 wherein the strip is formed of an elastic material and is generally non-conductive.

8. The fuel cell of claim 1 wherein when the fuel cell is in the operational state is defined as when the fuel cell is actively receiving the first fluid from a cathode source such that the fuel cell generates electrical power in response thereto.

9. The fuel cell of claim 1 wherein when the fuel cell is in the inoperative state is defined as when the fuel cell is not receiving the first fluid from a cathode source thereby preventing the fuel cell from generating electrical power.

10. A fuel cell comprising:
a cathode flow field plate defining a plurality of cathode channels for receiving a fluid from a cathode source when the fuel cell is in an operational state; and
a strip including a flexible first portion positioned about the plurality of cathode channels, the flexible first portion moving toward the plurality of cathode channels to prevent a flow of the fluid therein when the fuel cell is in an inoperative state.

11. The fuel cell of claim 10 wherein the flexible first portion moves from the plurality of cathode channels to enable the flow of the fluid therein when the fuel cell is in the operational state.

12. The fuel cell of claim 10 wherein the strip further includes a second portion and a dividing portion.

13. The fuel cell of claim 12 wherein the second portion is coupled to a surface of the fuel cell and the flexible first portion being configured to move relative to the dividing portion.

14. The fuel cell of claim 12 wherein the flexible first portion is positioned at an angle of less than 180 degrees with respect to the second portion when the flexible first portion is moved toward the plurality of cathode channels.

15. The fuel cell of claim 12 wherein the flexible first portion is formed of rubber and is generally non-conductive and wherein the second portion is formed of one of stainless steel, graphite, and gold foil.

16. The fuel cell of claim 10 wherein the strip is formed of rubber and is generally non-conductive.

17. The fuel cell of claim 10 wherein when the fuel cell is in the operational state is defined as when the fuel cell is actively receiving the fluid from the cathode source such that the fuel cell generates electrical power in response thereto.

18. The fuel cell of claim 10 wherein when the fuel cell is in the inoperative state is defined as when the fuel cell is not receiving the fluid from the cathode source thereby preventing the fuel cell from generating electrical power.

19. A fuel cell stack comprising:
a plurality of fuel cells for generating electrical power, each fuel cell including:
a cathode flow field plate defining a plurality of cathode channels for receiving a first fluid from a cathode source when the fuel cell is in an operational state; and
a strip including a flexible first portion positioned about the plurality of cathode channels, the flexible first portion for moving toward the plurality of cathode channels to prevent a flow of the first fluid therein when the fuel cell is in an inoperative state.

20. The fuel cell stack of claim 19 wherein the flexible first portion for each fuel cell is moveable from the plurality of cathode channels to enable the flow of the first fluid therein when the fuel cell is in the operational state.

\* \* \* \* \*